Sept. 20, 1938.　　　J. M. OLDHAM　　　2,130,597
SNAP FASTENER
Filed May 19, 1937
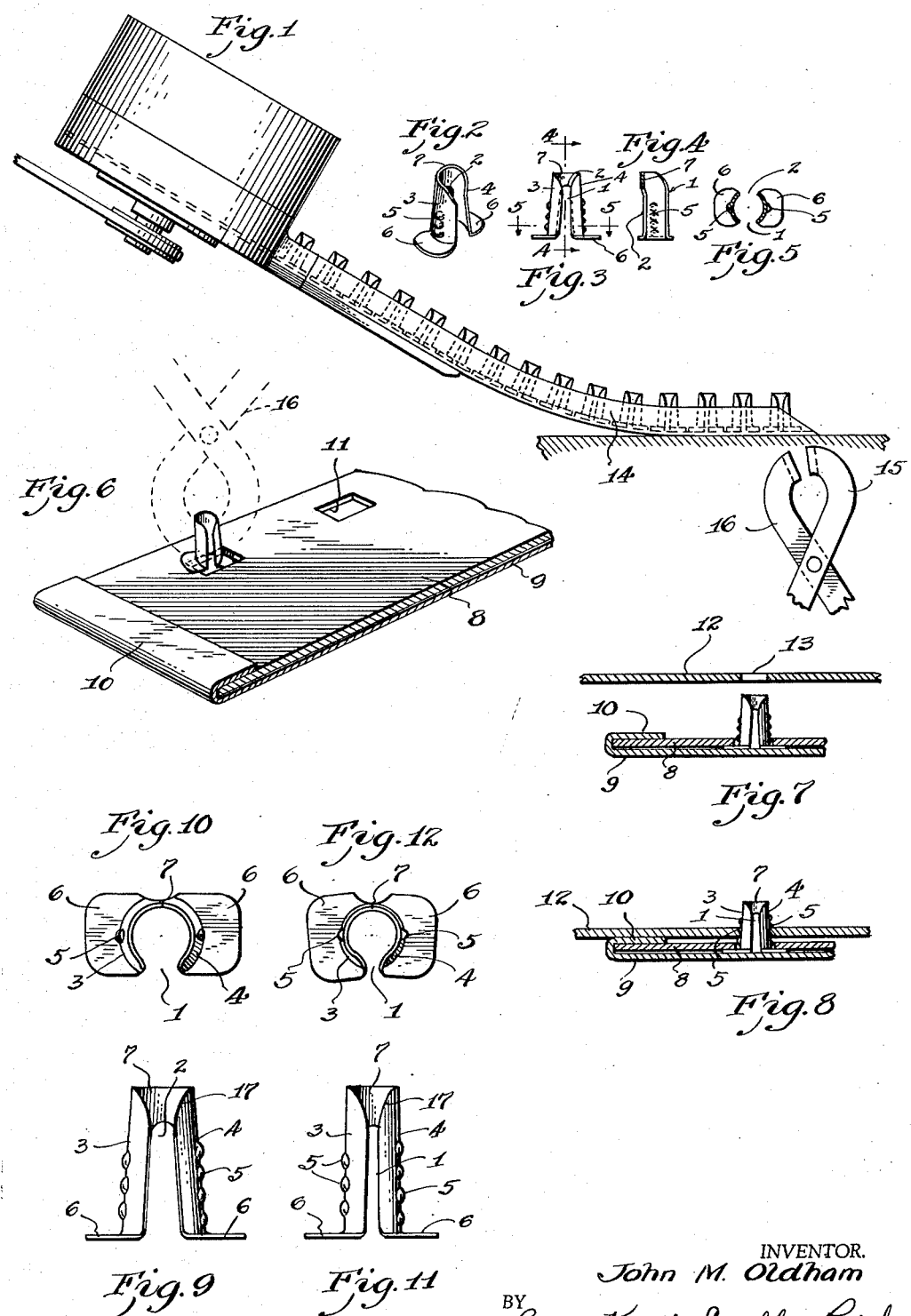
INVENTOR.
John M. Oldham
BY
Barnes, Kisselle, Laughlin & Raisch
ATTORNEYS Patented Sept. 20, 1938

2,130,597

UNITED STATES PATENT OFFICE 2,130,597

SNAP FASTENER

John M. Oldham, Pleasant Ridge, Mich., assignor to L. A. Young, Detroit, Mich.

Application May 19, 1937, Serial No. 143,404

4 Claims. (Cl. 24—213)

This invention relates to snap fasteners, especially snap fasteners used for fastening the trimming or ornamental molding on automobile bodies.

The prevailing method of fastening trimming panels to automobile bodies today is to use a spring wire clip which is fastened behind the paper board panel on which the door trimming is mounted. These clips are somewhat difficult to get behind the trim panel because the head is comparatively unyielding. Various methods have been proposed for inserting the clip in the trim door panel, such as bayonet slots, tipping the clip to an angular position to crowd the clip through a narrow slot, etc. Another difficulty has been that these clips, after being snapped in place, are very often somewhat loose in their sockets as they have only a two-point bearing on the socket edges and sometimes they do not even bear after the enlarged portion of the clip legs passes through the slot.

It is the object of the present invention to provide a fastener of very simple construction but which provides spring stress at all times between the fastener and the socket and is, therefore, noiseless. That stress is both a spreading stress and unrolling stress afforded by the tendency of the fastener's stem to unroll after it has been subjected to the curling or winding action when passing through the socket. This gives the fastener a very firm anchorage in the socket so that it never wobbles and the head of the fastener projects a minimum distance beyond the paper board trim panel so as to avoid unsightly protuberances in the trimming material due to the bulk of the wire clip head or the shifting of the wire clip inwardly of the trim panel.

Furthermore, the fastener is very nicely adapted to magazine feeding to the work table so that the fastener may be easily grasped by a tool for insertion in the trim panel.

I propose also that the fastener may be inserted in the cardboard panel by means of a suitable automatic machine which grasps the fastener, contracts it and finds the opening in the panel that carries the fastener down into the opening and then releases it to allow the head portions to expand behind the paper board. This is not shown here as it is no part of the present invention.

In the drawing:

Fig. 1 shows the fasteners being fed from a magazine to the table to be grasped by a tool similar to a pair of pliers.

Fig. 2 is a perspective of the fastener.

Fig. 3 is an elevation of the same.

Fig. 4 is a longitudinal section of the same on the line 4—4 of Fig. 3.

Fig. 5 is a cross section of the same on the line 5—5 of Fig. 3.

Fig. 6 is a perspective showing how the fastener is inserted in the trim panel.

Fig. 7 is a section showing the fastener inserted in the trim panel and the trim panel ready to be applied to the metal door panel.

Fig. 8 shows the trim panel applied to the door panel.

Fig. 9 is an enlarged side elevation showing the fastener before contraction.

Fig. 10 is a plan view of the fastener in the same condition.

Fig. 11 is an enlarged elevation showing the fastener after contraction.

Fig. 12 is a plan view of the fastener under the same conditions.

The fastener comprises simply a piece of spring strip metal stamped to the shape shown in Fig. 9. The stem of the fastener is formed by a tapered or conical double slotted hollow cylinder or tube in which one slot extends the entire length of the fastener and the other slot, which is diametrically opposite the first slot, extends about three-quarters of the length. The long slot is designated 1, the short slot 2. This divides the fastener into two prongs or legs 3 and 4 provided with struck out projections or nubs 5. Each one of these prongs has a turned out flange or head portion 6. The two prongs are each part of a cylinder in cross section but somewhat less than 180°. The prongs are joined at their tips by the arcuate tie-piece or isthmus 7.

The usual automobile door trim panel comprises a paper board panel 8 over which the trimming 9 is drawn, then folded back as at 10, and secured to the panel. It is usual to provide slotted openings 11 and the head of the spring wire clip has to be crowded into these openings ordinarily by tilting the head near a right angle and then turning it to a position behind the paper board trim panel. With my proposed fastener, this does not have to be done necessarily although the fastener, of course, can be inserted in the same way as the wire clip head.

My fastener can be grasped by a pinching tool such as is diagrammatically shown in Fig. 1. Grasping the conical or tapered steel portion immediately under the flanges or head portions, a fastener can be contracted to the condition shown in Figs. 11 and 12. This will enable the fastener to be inserted in a slot of given dimensions. When the pinching tool releases the fastener, the fastener expands and the flanges or head portions lock behind the paper board panel. This is a much easier way of inserting the fastener than tilting it to exactly the right position to crowd it in between the trimming and the paper board panel. This prevents the fastener head from working out beyond the inner surface of the paper board panel so as to distort the trimming material.

After the fastener has been fastened in the trim panel, as shown in Fig. 7, the trim panel can be applied to the metal door panel 12 simply by pushing the fastener stems through the sockets or openings 13. The fastener being preferably tapered or conical, the free end of the stem will easily find the socket 13 and by forcibly pushing the fastener into the opening, the divergent prongs will be pushed together as shown in Figs. 11 and 12. This will mean not only a fulcruming action on the tie-piece, but also a rolling up of the arcuate cross section of each prong. Hence, it will not only be the spring stress afforded by a pair of diverging legs which is the mode of operation of the well-known spring wire clip, but also the curling up action of the cross section of the prong affords a substantial continuous contact of the prong with the wall of the socket and thereby securely locks the fastener stem into the socket so that it will not rattle, wobble, or shift in any way. This is a great improvement over the relatively loose and shifting spring wire clip or the form of clip which is made of sheet metal with a pair of shear blades. Both these types of clips have only two-point contacts with the socket and they are more or less free to wobble or shift under given conditions.

My fastener is very well adapted for the magazine feeding of the work table as shown in Fig. 1. The fastener has enough substance and material so that it can be very easily handled in an automatic magazine feeding mechanism and the fasteners can be sent down a guide 14 to the work table 15 where they may be easily seized by a pinching tool 16. The stem of the fastener provides enough surface to be easily found and seized by the tool. The fastener may be lifted from the guide or table by the tool and contracted to the condition shown in Figs. 11 and 12 and then inserted in a properly dimensioned slot 11 as shown in Fig. 6. The head portions then snap behind the paper board panel and the clip is anchored to the trim panel. I have already explained how the fastener stems are guided into the openings or sockets in the metal door panel and the fastener prongs are not only squeezed together but also curled to anchor the fastener in the metal panel.

The ends of the leg or prong portions are rounded off as at 17 to prevent one from injuring his hands in handling the fasteners and preventing the fasteners catching together when being operated upon in the magazine.

Fasteners also are useful in applying the ornamental metal moldings that are used particularly along the belt of the present day automobile bodies. There are, of course, many other uses for the fasteners even outside of the automobile industry.

What I claim is:

1. A snap fastener comprising strip spring metal formed into a double slotted tubular stem, one slot going the entire length of the stem and the other only part of the length leaving the slots with two open ends at one end of the stem, the ends of the stem portions at said end being turned over into flanges to form a contractible head portion.

2. A snap fastener comprising strip spring metal formed into a tapered or conical hollow stem portion double slotted longitudinally of the stem, one slot extending the entire length of the stem and the other slot short of the complete length of the stem at the small end leaving a tie-piece, the enlarged end of the stem having turned out flanges to form the head of the fastener.

3. A snap fastener comprising strip spring metal formed into a tapered or conical hollow stem portion double slotted longitudinally of the stem, one slot extending the entire length of the stem and the other slot short of the complete length of the stem at the small end leaving a tie-piece, the enlarged end of the stem having turned out flanges to form the head of the fastener, the stem being substantially circular in cross section and the portions of the stem provided with struck out projections or nubs.

4. A snap fastener comprising strip spring metal formed into a tapered or conical hollow stem double slotted longitudinally of the stem, one slot extending the entire length of the stem and the other slot short of the complete length of the stem at the small end leaving a tie-piece, the enlarged end of the stem having turned out separate flanges to form the head of the fastener, the stem being substantially circular in cross section, the said stem portion being capable of being squeezed together to pass through an opening of smaller cross section and when released anchored itself in the said opening by both a spreading stress of the prong portions and also an unwinding stress of the arcuate sections of the prong portions.

JOHN M. OLDHAM.